(12) United States Patent
Sakamoto et al.

(10) Patent No.: US 9,950,963 B2
(45) Date of Patent: Apr. 24, 2018

(54) THERMAL INSULATOR AND METHOD OF MANUFACTURING THE SAME

(71) Applicant: NICHIAS CORPORATION, Tokyo (JP)

(72) Inventors: Akifumi Sakamoto, Tokyo (JP); Yoshihiko Goto, Tokyo (JP); Yasuo Ito, Tokyo (JP); Ken Maeda, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 169 days.

(21) Appl. No.: 15/143,007

(22) Filed: Apr. 29, 2016

(65) Prior Publication Data

US 2016/0244371 A1  Aug. 25, 2016

Related U.S. Application Data

(62) Division of application No. 13/993,849, filed as application No. PCT/JP2011/078795 on Dec. 13, 2011, now abandoned.

(30) Foreign Application Priority Data

Dec. 22, 2010 (JP) ................................ 2010-286581
Apr. 12, 2011 (JP) ................................ 2011-088318

(51) Int. Cl.
*B28B 11/24* (2006.01)
*F16L 59/02* (2006.01)
(Continued)

(52) U.S. Cl.
CPC .......... *C04B 35/6269* (2013.01); *B28B 11/24* (2013.01); *B28B 11/243* (2013.01);
(Continued)

(58) Field of Classification Search
None
See application file for complete search history.

(56) References Cited

U.S. PATENT DOCUMENTS 3,055,831 A   9/1962 Barnett et al.
4,447,345 A   5/1984 Kummermehr et al.
(Continued)

FOREIGN PATENT DOCUMENTS

CA   2231428 A1   3/1997
CN   1204678 A    1/1999
(Continued)

OTHER PUBLICATIONS

May 15, 2017 Office Action issued in Chinese Application No. 201610051706A.
(Continued)

*Primary Examiner* — Mary Lynn F Theisen
(74) *Attorney, Agent, or Firm* — Oliff PLC

(57) ABSTRACT

A thermal insulator with both excellent heat insulation and strength and a method of manufacturing the thermal insulator are provided.

A thermal insulator according to the present invention includes metal oxide fine particles with an average particle diameter equal to or smaller than 50 nm and a reinforcing fiber, wherein the thermal insulator has a bridge structure between the metal oxide fine particles which is formed by elution of part of the metal oxide fine particles. A method of manufacturing a thermal insulator according to the present invention includes a curing step of curing a dry pressed compact including metal oxide fine particles with an average particle diameter equal to or smaller than 50 nm and a reinforcing fiber under a pressurized vapor saturated atmo-
(Continued)

sphere at a temperature equal to or higher than 100° C. for four hours and a drying step of drying the cured dry pressed compact.

11 Claims, 7 Drawing Sheets

(51) Int. Cl.
    *C04B 35/626*     (2006.01)
    *F27D 7/06*     (2006.01)
    *C04B 30/02*     (2006.01)
    *C04B 111/28*     (2006.01)

(52) U.S. Cl.
    CPC ............ *B28B 11/247* (2013.01); *C04B 30/02* (2013.01); *F27D 7/06* (2013.01); *C04B 2111/28* (2013.01); *Y10T 428/268* (2015.01)

(56) References Cited

U.S. PATENT DOCUMENTS

| | | | |
|---|---|---|---|
| 4,451,294 | A | 5/1984 | Popov et al. |
| 5,306,555 | A | 4/1994 | Ramamurthi et al. |
| 5,866,027 | A | 2/1999 | Frank et al. |
| 6,143,400 | A | 11/2000 | Schwertfeger et al. |
| 2008/0014402 | A1 | 1/2008 | Tomich |
| 2011/0089363 | A1 | 4/2011 | Ito et al. |
| 2011/0091721 | A1 | 4/2011 | Ito et al. |
| 2013/0266801 | A1 | 10/2013 | Sakamoto et al. |
| 2016/0244371 | A1 | 8/2016 | Sakamoto et al. |

FOREIGN PATENT DOCUMENTS

| | | |
|---|---|---|
| CN | 1263867 A | 8/2000 |
| CN | 1673166 A | 9/2005 |
| CN | 101698591 A | 4/2010 |
| CN | 103269998 B | 1/2016 |
| EP | 2256542 A1 | 12/2010 |
| JP | H01-145497 A | 6/1989 |
| JP | H11-513349 A | 11/1999 |
| JP | H11-514959 A | 12/1999 |
| JP | 2002-524385 A | 8/2002 |
| JP | 2004-340194 A | 12/2004 |
| JP | 2004-340420 A | 12/2004 |
| JP | 2007-197264 A | 8/2007 |
| JP | 2009-299893 A | 12/2009 |
| JP | 2011-181258 A | 9/2011 |

OTHER PUBLICATIONS

Silica Aerogel article downloaded from http://www.aerogel.org/?p=16 on Dec. 15, 2015.
Jul. 12, 2011 Notice of Reasons for Refusal issued in Japanese Application No. 2011-088318.
Mar. 13, 2012 International Search Report issued in International Application No. PCT/JP2011/078795.
Jul. 2, 2013 International Preliminary Report on Patentability issued in International Application No. PCT/JP2011/078795.
Jun. 25, 2013 Office Action issued in Japanese Application No. 2009-239326.
Jul. 2, 2013 Office Action issued in Japanese Application No. 2009-239327.
Jul. 7, 2014 Supplementary European Search Report issued in European Application No. 11852179.8.
Jan. 29, 2016 Office Action issued in U.S. Appl. No. 13/993,849.
Sep. 9, 2015 Office Action issued in U.S. Appl. No. 13/993,849.
May 18, 2015 Office Action issued in U.S. Appl. No. 13/993,849.
Oct. 14, 2014 Office Action issued in U.S. Appl. No. 13/993,849.
Apr. 10, 2014 Office Action issued in U.S. Appl. No. 13/993,849.

| A/C CURING CONDITIONS | TEMPERATURE | 170°C | | | | | | | | 160°C | 180°C |
|---|---|---|---|---|---|---|---|---|---|---|---|
| | TIME | BEFORE CURING | 0hr | 0.5hr | 1hr | 2hr | 3hr | 6hr | 9hr | 2hr | 2hr |
| COMPRESSIVE STRENGTH (MPa) | AVERAGE | 0.21 | 0.80 | 0.98 | 1.06 | 1.26 | 1.12 | 0.86 | 0.80 | 1.14 | 1.17 |
| | MAXIMUM | 0.24 | 0.88 | 1.13 | 1.19 | 1.44 | 1.22 | 0.93 | 0.84 | 1.22 | 1.32 |
| | MINIMUM | 0.19 | 0.71 | 0.91 | 0.99 | 1.07 | 1.03 | 0.78 | 0.78 | 0.99 | 1.04 |

| VAPOR CURING CONDITIONS | TEMPERATURE | 80°C | | | | | | | | |
|---|---|---|---|---|---|---|---|---|---|---|
| | TIME | BEFORE CURING | 3hr | 6hr | 12hr | 24hr | 48hr | 100hr | 250hr | 400hr |
| COMPRESSIVE STRENGTH (MPa) | AVERAGE | 0.21 | 0.40 | 0.42 | 0.52 | 0.56 | 0.68 | 0.92 | 1.01 | 1.08 |
| | MAXIMUM | 0.24 | 0.45 | 0.46 | 0.64 | 0.62 | 0.74 | 1.01 | 1.18 | 1.24 |
| | MINIMUM | 0.19 | 0.38 | 0.40 | 0.42 | 0.52 | 0.60 | 0.85 | 0.89 | 0.91 |

FIG.10

| | METAL OXIDE FINE PARTICLES (MASS %) | | REINFORCING FIBER (MASS %) | | RADIATING AND SCATTERING MATERIAL (MASS %) | | COMPRESSIVE STRENGTH (NORMAL) (MPa) | | | COMPRESSIVE STRENGTH (AFTER WATER IMMERSION) (MPa) | | | HOT-WIRE SHRINKAGE RATIO(%) (1000°C) | | | HOT-WIRE SHRINKAGE RATIO(%) (1150°C) | | | HEAT CONDUCTIVITY (W/(m·K)) | | |
|---|---|---|---|---|---|---|---|---|---|---|---|---|---|---|---|---|---|---|---|---|---|
| | SILICA ($SiO_2$) | ALUMINA ($Al_2O_3$) | GLASS FIBER (S2) | ALUMINA FIBER ($Al_2O_3$) | SILICON CARBIDE (SiC) | ZIRCONIUM SILICATE ($ZrSiO_4$) | #250 | #350 | #450 | #250 | #350 | #450 | #250 | #350 | #450 | #250 | #350 | #450 | 600°C | 800°C | 1000°C |
| EXAMPLE IV | 75.00 (100) | 0.00 (0) | 5.00 | 0.00 | 20.00 | 0.00 | 0.75 | 1.75 | 2.80 | 0.15 | 0.35 | 0.95 | 4.30 | 3.53 | 2.92 | 36.92 | 27.90 | 21.49 | 0.040 | 0.044 | 0.077 |
| EXAMPLE V | 52.50 (70) | 22.50 (30) | 5.00 | 0.00 | 20.00 | 0.00 | 0.26 | 0.80 | 1.36 | — | — | — | 1.45 | 1.30 | 1.21 | 21.89 | 16.54 | 12.74 | — | — | — |
| EXAMPLE VI | 37.50 (50) | 37.50 (50) | 5.00 | 0.00 | 20.00 | 0.00 | 0.20 | 0.54 | 1.25 | — | — | — | 0.88 | 0.83 | 0.79 | 11.23 | 11.72 | 12.41 | — | — | — |
| EXAMPLE VII | 22.50 (30) | 52.50 (70) | 5.00 | 0.00 | 20.00 | 0.00 | 0.12 | 0.45 | 0.92 | — | — | — | 0.73 | 0.50 | 0.56 | 4.86 | 6.10 | 5.25 | — | — | — |
| EXAMPLE VIII | 19.00 (25) | 56.00 (75) | 0.00 | 5.00 | 20.00 | 0.00 | 0.16 | 0.42 | 0.82 | 0.05 | 0.12 | 0.23 | 0.41 | 0.24 | 0.11 | 8.31 | 6.35 | 4.85 | 0.041 | 0.047 | 0.055 |
| EXAMPLE IX | 11.25 (15) | 63.75 (85) | 5.00 | 0.00 | 20.00 | 0.00 | 0.10 | 0.27 | 0.70 | — | — | — | 0.50 | 0.29 | 0.26 | 2.71 | 2.55 | 2.57 | 0.039 | 0.045 | 0.052 |
| EXAMPLE X | 11.25 (15) | 63.75 (85) | 0.00 | 5.00 | 20.00 | 0.00 | 0.12 | 0.34 | 0.61 | 0.03 | 0.09 | 0.16 | 0.40 | 0.23 | 0.07 | 3.21 | 2.80 | 2.44 | 0.038 | 0.043 | 0.051 |
| EXAMPLE XI | 11.25 (15) | 63.75 (85) | 0.00 | 5.00 | 0.00 | 20.00 | 0.13 | 0.36 | 0.72 | 0.03 | 0.08 | 0.15 | 0.62 | 0.36 | 0.18 | 3.20 | 2.79 | 2.43 | 0.042 | 0.046 | 0.081 |
| COMPARATIVE EXAMPLE IV | 0.00 (0) | 75.00 (100) | 5.00 | 0.00 | 20.00 | 0.00 | 0.05 | 0.20 | 0.34 | — | — | — | 0.56 | 0.46 | 0.38 | 2.53 | 2.70 | 2.71 | — | — | — |
| COMPARATIVE EXAMPLE V | 0.00 | 60.00 | 0.00 | 5.00 | 0.00 | 35.00 | — | — | 0.28 | DECAY | DECAY | DECAY | — | — | 0.12 | — | — | 0.92 | 0.041 | 0.049 | 0.060 |
| COMPARATIVE EXAMPLE VI | 0.00 | 60.00 | 0.00 | 5.00 | 0.00 | 35.00 | — | — | 0.24 | DECAY | DECAY | DECAY | — | — | 0.12 | — | — | 0.92 | — | — | — |

THERMAL INSULATOR AND METHOD OF MANUFACTURING THE SAME

TECHNICAL FIELD

The present invention relates to a thermal insulator and a method of manufacturing the thermal insulator and, in particular, to an improvement in strength of the thermal insulator.

BACKGROUND ART

Conventionally, as a thermal insulator with low heat conductivity and excellent thermal insulating properties, there is a thermal insulator obtained by mixing silica fine particles, inorganic fiber, and a binder and performing press forming and then machining (for example, Patent Literatures 1 and 2).

CITATION LIST

Patent Literatures

Patent Literature 1: JP H11-513349 (A)
Patent Literature 2: JP H11-514959 (A)

SUMMARY OF INVENTION

Technical Problem

However, in the conventional technology described above, since the binder is used, there have been a problem such that degreasing is required which decreases the strength of the thermal insulator. Moreover, load on environments has been increased by the use of the binder. As such, when the binder is used, there has been a problem such that the number of processes, the time required and energy are increased.

In contrast, it is possible to increase the strength of the thermal insulator without using a binder by adjusting a pressing pressure to increase the density of the thermal insulator. In this case, however, for example, there has been a problem such that the thermal insulation properties of the thermal insulator are decreased because solid heat transfer increases with the increase in density.

The present invention was made in view of the problems described above, and has an object of providing a thermal insulator with both excellent heat insulation properties and strength and a method of manufacturing the thermal insulator.

Solution to Problems

A thermal insulator according to an embodiment of the present invention to solve the problem described above includes metal oxide fine particles with an average particle diameter equal to or smaller than 50 nm and a reinforcing fiber, wherein the thermal insulator has a bridge structure between the metal oxide fine particles which is formed by elution of part of the metal oxide fine particles. According to the present invention, a thermal insulator with both excellent heat insulation properties and strength is provided.

Also, the metal oxide fine particles may include silica fine particles. Furthermore, the thermal insulator may have a bulk density and a compressive strength of the following (a) or (b): (a) the bulk density is equal to or larger than 180 kg/m$^3$ and equal to or smaller than 300 kg/m$^3$ and the compressive strength is equal to or larger than 0.6 MPa or (b) the bulk density exceeds 300 kg/m$^3$ and equal to or smaller than 500 kg/m$^3$ and the compressive strength is equal to or larger than 0.8 MPa.

Furthermore, the metal oxide fine particles may include alumina fine particles. In this case, the thermal insulator may have a hot-wire shrinkage ratio at 1000° C. equal to or smaller than 3%.

Still further, the thermal insulator may include 50 to 98 mass % of the metal oxide fine particles and 2 to 20 mass % of the reinforcing fiber. Still further, the thermal insulator may not comprise a binder.

A method of manufacturing a thermal insulator according to an embodiment of the present invention to solve the problem described above includes a curing step of curing a dry pressed compact including metal oxide fine particles with an average particle diameter equal to or smaller than 50 nm and a reinforcing fiber under a pressurized vapor saturated atmosphere at a temperature equal to or higher than 100° C. and a drying step of drying the cured dry pressed compact. According to the present invention, a thermal insulator with both excellent heat insulation properties and strength is provided.

Also, in the curing step, part of the metal oxide fine particles may be eluted between the metal oxide fine particles to form a liquid bridge structure, and in the drying step, the bridge structure may be solidified.

Furthermore, the metal oxide fine particles may include silica fine particles. Still further, the metal oxide fine particles may include alumina fine particles.

Still further, the dry pressed compact may include 50 to 98 mass % of the metal oxide fine particles and 2 to 20 mass % of the reinforcing fiber. Still further, the dry pressed compact may not comprise a binder.

A thermal insulator according to an embodiment of the present invention to solve the problem described above is manufactured by any one of the methods described above. According to the present invention, a thermal insulator with both excellent heat insulation properties and strength is provided.

Advantageous Effects of Invention

According to the present invention, a thermal insulator with both excellent heat insulation properties and strength and a method of manufacturing a thermal insulator are provided.

BRIEF DESCRIPTION OF DRAWINGS

FIG. 10 is a diagram for describing an example of results of evaluating compressive strengths, hot-wire shrinkage ratio, and heat conductivity of the thermal insulator in examples according to an embodiment of the present invention.

DESCRIPTION OF EMBODIMENTS

An embodiment of the present invention will be described below. It should be noted that the present invention is not limited to the present embodiment.

Figure 1:
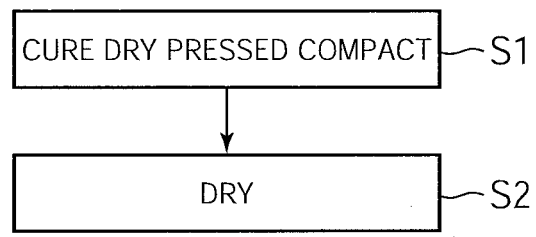
FIG. 1 is a diagram for describing main processes included in an example of a method of manufacturing a thermal insulator according to an embodiment of the present invention.

First, a method of manufacturing a thermal insulator according to the present embodiment (hereinafter referred to as "the method") will be described. FIG. 1 is a diagram for describing main processes included in an example of the method. As depicted in FIG. 1, the method includes a curing step S1 of curing a dry pressed compact including metal oxide fine particles with an average particle diameter equal to or smaller than 50 nm and a reinforcing fiber under a pressurized vapor saturated atmosphere at a temperature equal to or higher than 100° C. and a drying step S2 of drying the cured dry pressed compact.

The dry pressed compact cured in the curing step S1 is fabricated from a thermal insulator raw material including metal oxide fine particles and a reinforcing fiber. The metal oxide fine particles are not particularly limited as long as they have an average particle diameter equal to or smaller than 50 nm, and any one type may be singly used or two types or more may be combined to be used.

A metal oxide constituting the metal oxide fine particles is not particularly limited as long as it is eluted from the fine particles in a pressurized vapor saturated atmosphere at a temperature equal to or higher than 100° C. (it is dissoluble in water). For example, silica and/or alumina may be preferably used, and silica may be particularly preferably used.

That is, the metal oxide fine particles preferably include silica fine particles and/or alumina fine particles, and particularly preferably include silica fine particles. When the metal oxide fine particles include silica fine particles, the strength of the thermal insulator manufactured by the method is particularly effectively increased. When the metal oxide fine particles include silica fine particles, the metal oxide fine particles may further include alumina fine particles. When the metal oxide fine particles include alumina fine particles, heat resistance of the thermal insulator manufactured by the method is also effectively increased.

As silica fine particles and/or alumina fine particles, one or both of those manufactured by a vapor phase method and those manufactured by a wet method may be used, and those manufactured by the vapor phase method may be preferably used.

That is, as silica fine particles and/or alumina fine particles, dry silica fine particles (anhydrous silica fine particles) and/or dry alumina fine particles (anhydrous alumina fine particles) manufactured by a vapor phase method may be used. Also, wet silica fine particles and/or wet alumina fine particles manufactured by a wet method may be used. Among these, the dry silica fine particles and/or the dry alumina fine particles may be preferably used.

More specifically, for example, fumed silica fine particles and/or fumed alumina fine particles manufactured by a vapor phase method may be preferably used. Among these, hydrophilic fumed silica fine particles and/or hydrophilic fumed alumina fine particles may be preferably used. The content of silica ($SiO_2$) of the silica fine particles and the content of alumina ($Al_2O_3$) of the alumina fine particles are, for example, preferably equal to or larger than 95 wt %.

The metal oxide fine particles have an average particle diameter (more specifically, an average particle diameter of the primary particles of the metal oxide fine particles), which is not particularly limited as long as it is equal to or smaller than 50 nm. For example, the average particle diameter may be equal to or larger than 2 nm and equal to or smaller than 50 nm, and also may be equal to or larger than 2 nm and equal to or smaller than 30 nm.

The specific surface area of the metal oxide fine particles according to the BET method may be preferably, for example, equal to or larger than 50 $m^2/g$. More specifically, the specific surface area may be preferably, for example, equal to or larger than 50 $m^2/g$ and equal to or smaller than 400 $m^2/g$ and, more preferably, equal to or large than 100 $m^2/g$ and equal to or smaller than 400 $m^2/g$.

The reinforcing fiber is not particularly limited as long as it reinforces the thermal insulator, and one or both of an inorganic fiber and an organic fiber may be used. The inorganic fiber is not particularly limited as long as it is used as a reinforcing fiber, and any one type may be singly used or two types or more may be combined for use.

Specifically, as the inorganic fiber, for example, one or more types selected from the group consisting of a glass fiber, a silica-alumina fiber, a silica fiber, an alumina fiber, a zirconia fiber, a silicate alkaline-earth metallic salt fiber, rock wool, and basalt fiber may be used, and a silica-based fiber and/or an alumina-based fiber such as a glass fiber, a silica-alumina fiber, a silica fiber, and an alumina fiber may be preferably used. Note that the silicate alkaline-earth metallic salt fiber is a biologically-soluble inorganic fiber. That is, as an inorganic fiber, one or both of a non-biologically-soluble inorganic fiber and a biologically-soluble inorganic fiber may be used.

The organic fiber is not particularly limited as long as it is used as a reinforcing fiber, and any one type may be singly used or two types or more may be combined for use. Specifically, as the organic fiber, for example, one or more types selected from the group consisting of an aramid fiber, a polyethylene fiber, a polypropylene fiber, and polyolefin fiber may be used.

The reinforcing fiber has an average fiber length, for example, preferably equal to or larger than 0.5 mm and equal to or smaller than 20 mm and more preferably equal to or larger than 1 mm and equal to or smaller than 10 mm. If the average fiber length is smaller than 1 mm, the reinforcing fiber may not be suitably oriented and, as a result, the thermal insulator may have an insufficient mechanical strength. If the average fiber length exceeds 20 mm, powder fluidity at the time of forming may be impaired to decrease formability and also decrease processability due to density variations.

The reinforcing fiber has an average fiber diameter, for example, preferably equal to or larger than 1 μm and equal to or smaller than 20 μm and more preferably equal to or larger than 2 μm and equal to or smaller than 15 μm. If the average fiber diameter exceeds 20 μm, the reinforcing fiber may tend to be broken and, as a result, the thermal insulator may have an insufficient strength.

Therefore, as the reinforcing fiber, for example, the one with an average fiber length equal to or larger than 0.5 mm and equal to or smaller than 20 mm and an average fiber diameter equal to or larger than 1 μm and equal to or smaller than 20 μm may be preferably used.

The dry pressed compact is fabricated by fabricating a dry mixture by mixing the metal oxide fine particles and the reinforcing fiber as described above by a dry method and then pressure-forming the dry mixture by a dry method.

Specifically, for example, the dry pressed compact is fabricated by dry-mixing a thermal insulator material including dry powder of the metal oxide fine particles and dry powder of the reinforcing fiber by using a predetermined mixing device and then filling a predetermined forming mold with the obtained dry mixture for dry press forming.

Note that by mixing and forming with a dry method, the material and the formed body are easily managed and the time required for manufacture is effectively reduced, compared with the case of a wet method.

The contents of the metal oxide fine particles and the reinforcing fiber in the dry pressed compact may be arbitrarily determined according to the characteristics required for the thermal insulator to be eventually manufactured. That is, for example, the dry pressed compact may include 50 to 98 mass % of the metal oxide fine particles and 2 to 20 mass % of the reinforcing fiber, and may include 65 to 80 mass % of the metal oxide fine particles and 5 to 18 mass % of the reinforcing fiber.

If the content of the reinforcing fiber is smaller than 2 mass %, the thermal insulator may have an insufficient strength. If the content of the reinforcing fiber exceeds 20 mass %, powder fluidity at the time of forming may be impaired to decrease formability and also decrease processability of the thermal insulator due to density variations.

Also, when the dry pressed compact includes only the metal oxide fine particles and the reinforcing fiber, for example, the dry pressed compact may include 80 to 98 mass % of the metal oxide fine particles and 2 to 20 mass % of the reinforcing fiber so that their total is 100 mass %, and the dry pressed compact may include 85 to 98 mass % of the metal oxide fine particles and 2 to 15 mass % of the reinforcing fiber so that their total is 100 mass %.

The dry pressed compact may not include a binder. That is, in the method, the strength of the thermal insulator is effectively improved by curing, which will be described further below, and therefore a binder is not required to be used.

In this case, the dry pressed compact does not substantially contain a binder conventionally used, such as an inorganic binder such as a liquid glass adhesive and an organic binder such as resin. Therefore, conventional problems with the use of a binder are reliably avoided. Also, while the temperature at which dry pressure forming is performed is not particularly limited, dry pressure forming may be performed at a temperature, for example, equal to or higher than 5° C. and equal to or lower than 60° C.

The dry pressed compact may further include another component. That is, for example, the dry pressed compact may include a radiating and scattering material. The radiating and scattering material is not particularly limited as long as it reduces heat transfer by radiation, and any one type may be singly used or two types or more may be combined for use. Specifically, as the radiating and scattering material, for example, one or more types selected from the group consisting of silicon carbide, zirconia, zirconium silicate, and titania may be used.

The radiating and scattering material has an average particle diameter, for example, preferably equal to or larger than 1 μm and equal to or smaller than 50 μm and more preferably equal to or larger than 1 μm and equal to or smaller than 20 μm. As the radiating and scattering material, a far-infrared reflexive material may be preferably used and, for example, a material with a specific refractive index with respect to light having a wavelength equal to or larger than 1 being equal to or larger than 1.25 is preferable.

When the radiating and scattering material is used, the dry pressed compact may include, for example, 50 to 93 mass % of the metal oxide fine particles, 2 to 20 mass % of the reinforcing fiber, and 5 to 40 mass % of the radiating and scattering material, and the dry pressed compact may include to 80 mass % of the metal oxide fine particles, 5 to 18 mass % of the reinforcing fiber, and 15 to 30 mass % of the radiating and scattering material.

Note that when the metal oxide fine particles include metal oxide fine particles of a plurality of types (for example, silica fine particles and alumina fine particles), the content of the metal oxide fine particles in the dry pressed compact described above is a total content of the metal oxide fine particles of the plurality of types (for example, a total of the content of silica fine particles and the content of alumina fine particles).

At the curing process S1, the dry pressed compact fabricated as described above is cured under a pressurized vapor saturated atmosphere at a temperature equal to or higher than 100° C. This curing is performed by holding the dry pressed compact in a pressurized vapor saturated atmosphere at a temperature equal to or higher than 100° C.

That is, for example, the dry pressed compact is placed in an airtight container having water accommodated therein (specifically, for example, in an autoclave with a temperature to be achieved being set equal to or higher than 100° C.), and the dry pressed compact is held for a predetermined time in an airtight state as being heated to a temperature equal to or higher than 100° C. Consequently, the dry pressed compact is cured.

The temperature at which curing is performed is not particularly limited as long as the temperature is equal to or higher than 100° C. and in a range where the effect by the curing is obtained. That is, for example, the curing temperature may be preferably equal to or higher than 100° C. and equal to or lower than 220° C., more preferably equal to or higher than 120° C. and equal to or lower than 200° C., and particularly preferably equal to or higher than 160° C. and equal to or lower than 180° C.

The pressure at which curing is performed is not particularly limited as long as the pressure is higher than an atmospheric pressure and in a range where the effect by the curing is obtained. That is, for example, the curing pressure may be equal to or larger than 0.2 MPa. More specifically, for example, the curing pressure may be equal to or larger than 0.2 MPa and equal to or smaller than 0.9 MPa, and may be equal to or larger than 0.7 MPa and equal to or smaller than 0.9 MPa.

Time for curing is not particularly limited as long as the effect by the curing is obtained with that time. That is, for example, the curing time may be equal to or more than 0.5 hour. More specifically, for example, the curing time may be preferably equal to or more than 0.5 hour and equal to or less than sixteen hours, and more preferably equal to or more than two hours and equal to or less than eight hours. If the curing time is too long, the strength of the thermal insulator may rather decrease.

At the subsequent drying step S2, the dry pressed compact cured at the curing step S1 is dried. That is, at the drying step S2, moisture derived from vapor and penetrating through the dry pressed compact at the time of curing is removed.

The drying method is not particularly limited as long as the method removes unnecessary moisture from the dry pressed compact. That is, for example, by holding the dry pressed compact at a temperature is equal to or higher than 100° C., the dry pressed compact is efficiently dried.

As such, in this method, the dry pressed compact after curing and drying is eventually obtained as a thermal insulator. According to the method, a thermal insulator with both excellent heat insulation and excellent strength is manufactured. That is, according to the method, the strength of the thermal insulator is effectively improved without excessively increasing the bulk density. Also, according to the method, a thermal insulator with sufficient strength is manufactured without using a binder.

Figure 2A:
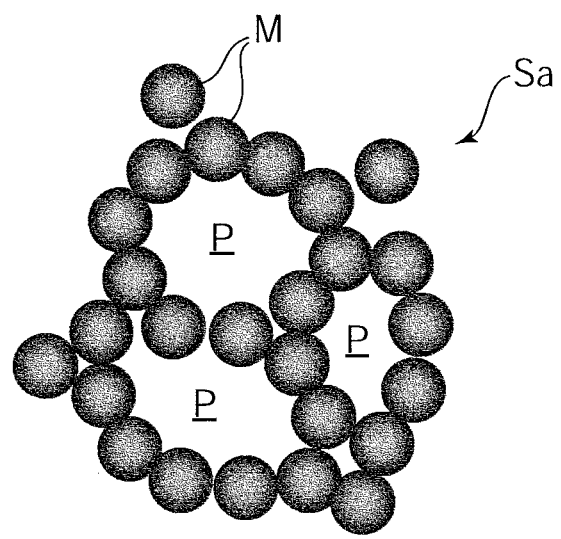
FIG. 2A is a diagram for conceptually describing primary particles of metal oxide fine particles included in dry pressed compact according to an embodiment of the present invention and a pore structure formed with the primary particles.
Figure 2B:
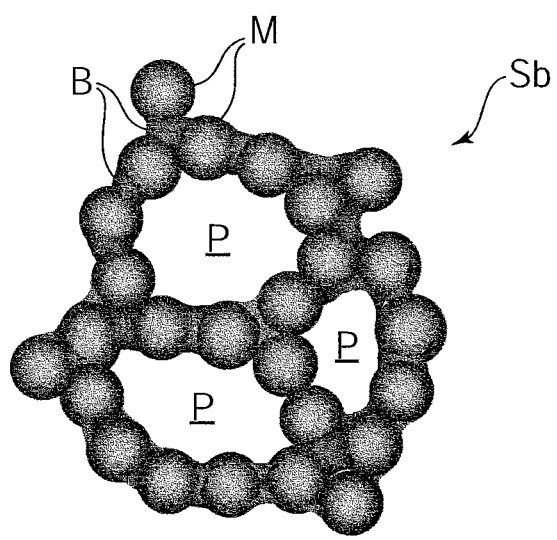
FIG. 2B is a diagram for conceptually describing primary particles of metal oxide fine particles included in the thermal insulator according to an embodiment of the present embodiment and a pore structure formed with the primary particles.

Here, a mechanism of improving the strength of the thermal insulator by curing in the method is described. FIG. 2A conceptually depicts primary particles (metal oxide fine particles) M of the metal oxide included in the dry pressed compact and a pore structure Sa formed of the primary particles M. FIG. 2B conceptually depicts primary particles (metal oxide fine particles) M included in the cured thermal insulator and a pore structure Sb formed of the primary particles M.

Figure 3A:
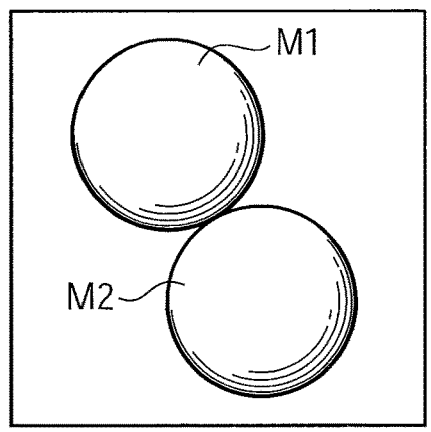
FIG. 3A is a diagram for conceptually describing the state of the primary particles of the metal oxide fine particles included in the dry pressed compact according to the embodiment of the present invention.
Figure 3B:
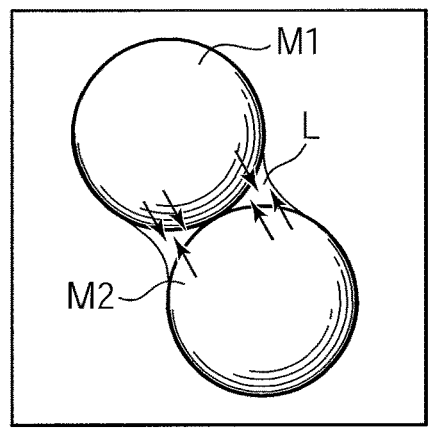
FIG. 3B is a diagram for conceptually describing the state in which a liquid bridge structure is formed between the primary particles of the metal oxide fine particles depicted in FIG. 3A.
Figure 3C:
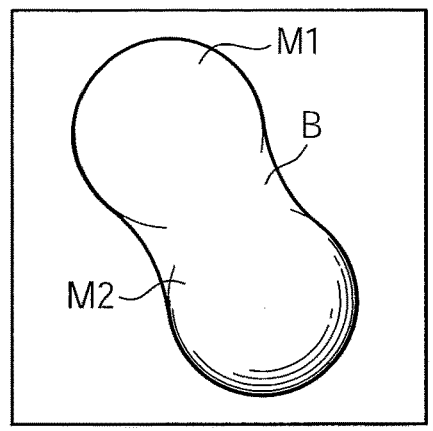
FIG. 3C is a diagram for conceptually describing the state in which a hardened bridge structure is formed between the primary particles of the metal oxide fine particles depicted in FIG. 3A in the thermal insulator according to the embodiment of the present invention.

FIG. 3A, FIG. 3B, and FIG. 3C are diagrams for conceptually describing the mechanism for improving the strength of the thermal insulator by curing, with attention being paid to two adjacent primary particles M1 and M2 among many primary particles included in the dry pressed compact or the thermal insulator. That is, FIG. 3A conceptually depicts the state of the primary particles M1 and M2 included in the dry pressed compact, FIG. 3B conceptually depicts the state in which a liquid bridge structure L is formed between the primary particles M1 and M2 during curing of the dry pressed compact, and FIG. 3C conceptually depicts the state in which a cured bridge structure B is formed between the primary particles M1 and M2 in the thermal insulator after curing.

First, as depicted in FIG. 2A, the dry pressed compact before curing has the primary particles M coagulated by dry pressure forming and secondary particles Sa formed with the primary particles M. The secondary particles Sa have pores P surrounded by the primary particles M.

When attention is paid to two adjacent primary particles M1 and M2 as depicted in FIG. 3A among many primary particles M depicted in FIG. 2A, the primary particles M1 and M2 are merely attached by an intermolecular force.

By contrast, when curing of the dry pressed compact starts, as depicted in FIG. 3B, the bridge structure L made of a liquid including the metal oxide eluted from the primary particles M1 and M2 is formed.

That is, the liquid bridge structure L including the eluted metal oxide is formed between the primary particles M1 and M2 during curing. Note that when the metal oxide is silica, the following silicate salt reaction is thought to be caused as an elution reaction: "$SiO_2 + 2H_2O \rightarrow H_4SiO_4 \rightarrow H^+ + H_3SiO_4^-$".

Then, the curing is finished and the cured dry pressed compact is dried, thereby the bridge structure L formed between the primary particles M1 and M2 is solidified. That is, in the thermal insulator after curing and drying, as depicted in FIG. 3C, the cured bridge structure B is formed between the primary particles M1 and M2.

Specifically, for example, when the metal oxide fine particles include silica fine particles, the thermal insulator has the bridge structure B between the primary particles M1 and M2 of the metal oxide fine particles which is formed by elution of part of the silica fine particles. Note that, for example, when the metal oxide fine particles include silica fine particles and alumina fine particles, the primary particles M1 and M2 depicted in FIG. 3C may be both silica fine particles or both alumina fine particles, or one of the particles may be a silica fine particle and the other may be an alumina fine particle.

As such, as depicted in FIG. 2B, the thermal insulator manufactured by the method has the pore structure Sb formed of many primary particles M coupled by the bridge structure B. This pore structure Sb is formed by elution of part of the primary particles M and, as a result, is observed (for example, observation with a transmission electron microscope) as a porous structure as if it is formed by fusion of the primary particles M.

Also, as depicted in FIG. 2B, the pore structure Sb has pores P surrounded by the primary particles M coupled by the bridge structure B. Each pore P formed in the pore structure Sb has a diameter of 10 to 200 nm, for example. The thermal insulator achieves excellent heat insulation by having this pore structure Sb.

Furthermore, this bridge structure B includes the eluted metal oxide. Also, the primary particles M1 and M2 (FIG. 3C) coupled by the bridge structure B each have a shape and/or size varied by curing (in particular, elution of the metal oxide), and can be different from that of the primary particles M1 and M2 (FIG. 3A) before curing.

Note that while elution of the metal oxide from the metal oxide fine particles may be promoted by adding an alkaline-earth metal hydroxide or an alkali metal hydroxide to the dry pressed compact, the dry pressed compact according to the present embodiment does not include an alkaline-earth metal hydroxide or an alkali metal hydroxide, and the thermal insulator according to the present embodiment does not include an alkaline-earth metal or an alkali metal derived from these hydrooxides.

With the formation of the bridge structure B, binding between the primary particles M is strengthened and, as a result, the strength of the thermal insulator is effectively increased. Note that a similar bridge structure is formed also between the metal oxide fine particles and the reinforcing fiber.

The thermal insulator according to the present embodiment (hereinafter referred to as "the thermal insulator") may be more preferably manufactured with the method described above. The thermal insulator includes, for example, metal oxide fine particles with an average particle diameter equal to or smaller than 50 nm and a reinforcing fiber, and the thermal insulator has a bridge structure between the metal oxide fine particles which is formed by elution of part of the metal oxide fine particles.

That is, the thermal insulator includes metal oxide fine particles and a reinforcing fiber which are used as a raw material of the dry pressed compact described above, and has a pore structure formed of the metal oxide fine particles coupled with the bridge structure described above. Therefore, the thermal insulator has excellent strength even if its bulk density is relatively low.

For example, the thermal insulator has a bulk density and a compressive strength of the following (a) or (b): (a) the bulk density is equal to or larger than 180 kg/m$^3$ and equal to or smaller than 300 kg/m$^3$ and the compressive strength is equal to or larger than 0.6 MPa or (b) the bulk density exceeds 300 kg/m$^3$ and equal to or smaller than 500 kg/m$^3$ and the compressive strength is equal to or larger than 0.8 MPa.

That is, in this case, the thermal insulator is a thermal insulator with a bulk density equal to or larger than 180 kg/m$^3$ and equal to or smaller than 300 kg/m$^3$ and a compressive strength equal to or larger than 0.6 MPa or a thermal insulator with a bulk density excessing 300 kg/m$^3$ and equal to or smaller than 500 kg/m$^3$ and a compressive strength equal to or larger than 0.8 MPa. For example, when the metal oxide fine particles include silica fine particles, this large compressive strength is more effectively achieved.

When the thermal insulator has the bulk density and the compressive strength as described in (a), the bulk density may be equal to or larger than 200 kg/m$^3$, for example. More specifically, for example, the thermal insulator may have a bulk density equal to or larger than 200 kg/m$^3$ and equal to or smaller than 250 kg/m$^3$ and 0.6 MPa or larger (for example, 0.6 MPa or larger and 1.5 MPa or smaller) and, when the bulk density exceeds 250 kg/m$^3$ and equal to or smaller than 300 kg/m$^3$, the thermal insulator may have 0.8 MPa or larger (for example, 0.8 MPa or larger and 2.0 MPa or smaller).

Note that the compressive strength of the thermal insulator is a breaking strength (MPa) when a load is applied to its press surface (a dry press surface at the time of manufacturing a dry pressed compact) in a perpendicular direction.

The contents of the metal oxide fine particles and the reinforcing fiber in the thermal insulator are arbitrarily determined according to the characteristics required. That is, for example, the thermal insulator may include 50 to 98 mass % of the metal oxide fine particles and 2 to 20 mass % of the reinforcing fiber. The thermal insulator may include 65 to 80 mass % of the metal oxide fine particles and 5 to 18 mass % of the reinforcing fiber.

If the content of the reinforcing fiber is smaller than 2 mass %, the strength of the thermal insulator may be insufficient. If the content of the reinforcing fiber exceeds mass %, processability of the thermal insulator may be decreased by density variations.

Also, when the thermal insulator includes only the metal oxide fine particles and the reinforcing fiber, for example, the thermal insulator may include 80 to 98 mass % of the metal oxide fine particles and 2 to 20 mass % of the reinforcing fiber so that their total is 100 mass %, and the thermal insulator may include 85 to 98 mass % of the metal oxide fine particles and 2 to 15 mass % of the reinforcing fiber so that their total is 100 mass %.

Note that when the metal oxide fine particles include metal oxide fine particles of a plurality of types (for example, silica fine particles and alumina fine particles), the content of the metal oxide fine particles in the thermal insulator described above is a total content of the metal oxide fine particles of the plurality of types (for example, a total of the content of silica fine particles and the content of alumina fine particles).

The thermal insulator may not include a binder. That is, since the strength of the thermal insulator is effectively improved by having the bridge structure described above, the thermal insulator is not required to include a binder.

In this case, the thermal insulator does not substantially contain a binder conventionally used, such as an inorganic binder such as a liquid glass adhesive and an organic binder such as resin. Therefore, conventional problems with the use of a binder are reliably avoided.

The thermal insulator may further include another component. That is, for example, the thermal insulator may include the radiating and scattering material as described above. When the thermal insulator includes radiating and scattering material, the thermal insulator may include, for example, 50 to 93 mass % of the metal oxide fine particles, 2 to 20 mass % of the reinforcing fiber, and 5 to 40 mass % of the radiating and scattering material, and the thermal insulator may include 65 to 80 mass % of the metal oxide fine particles, 5 to 18 mass % of the reinforcing fiber, and 15 to 30 mass % of the radiating and scattering material.

When the metal oxide fine particles include silica fine particles, the content of the silica fine particles in the thermal insulator is arbitrarily determined according to the characteristics required.

That is, for example, the thermal insulator may contain silica fine particles equal to or larger than 55 mass %, a bulk density equal to or larger than 180 kg/m$^3$ and equal to or smaller than 300 kg/m$^3$, and a compressive strength of 0.6 MPa or larger. In this case, the content of silica fine particles may be, for example, equal to or larger than 60 mass %, 65 mass %, or 70 mass %.

Also, the thermal insulator may contain silica fine particles equal to or larger than 40 mass %, a bulk density exceeding 300 kg/m$^3$ and equal to or smaller than 500 kg/m$^3$, and a compressive strength equal to or larger than 0.8 MPa. In this case, the content of silica fine particles may be, for example, equal to or larger than 45 mass % and equal to or larger than 50 mass %.

Furthermore, the thermal insulator may contain, for example, silica fine particles equal to or larger than 15 mass %, a bulk density exceeding 400 kg/m$^3$ and equal to or smaller than 500 kg/m$^3$, and a compressive strength equal to or larger than 0.8 MPa.

Note in these cases that the content of silica fine particles may be, for example, as described above, equal to or smaller than 98 mass %, may be equal to or smaller than 93 mass %, or may be equal to or smaller than 80 mass %.

Still further, when the thermal insulator includes alumina fine particles (in particular, when the thermal insulator includes silica fine particles and alumina fine particles), the thermal insulator has not only excellent strength but also excellent heat resistance.

That is, in this case, for example, the thermal insulator may have a hot-wire shrinkage ratio at 1000° C. being equal to or smaller than 3%. Also, the thermal insulator may have a hot-wire shrinkage ratio at 1150° C. being equal to or smaller than 15%.

In these cases, for example, the thermal insulator may include alumina fine particles equal to or larger than 5 mass %. For example, the content of alumina fine particles may be equal to or larger than 10 mass %, equal to or larger than 15 mass %, or equal to or larger than 20 mass %.

Also, the thermal insulator including alumina fine particles may have a hot-wire shrinkage ratio at 1000° C. being equal to or smaller than 1%. In this case, for example, the thermal insulator may include alumina fine particles equal to or larger than 25 mass %. For example, the content of alumina fine particles may be equal to or larger than 30 mass % or equal to or larger than 35 mass %.

Furthermore, the thermal insulator including alumina fine particles may have a hot-wire shrinkage ratio at 1150° C. being equal to or smaller than 10%. In this case, for example, the thermal insulator may include alumina fine particles equal to or larger than 40 mass %. For example, the content of alumina fine particles may be equal to or larger than 45 mass %.

Still further, the thermal insulator including alumina fine particles may have a hot-wire shrinkage ratio at 1150° C. being equal to or smaller than 3%. In this case, for example, the thermal insulator may include alumina fine particles equal to or larger than 60 mass %. Still further, the thermal insulator may have a bulk density exceeding 300 kg/m$^3$.

Note that, for example, the thermal insulator including these alumina fine particles may include silica fine particles equal to or larger than 5 mass %, or may include silica fine particles equal to or larger than 10 mass %. Any combination of the contents of alumina fine particles and silica fine particles described above is available.

When the thermal insulator includes silica fine particles and alumina fine particles, the total content of silica fine particles and alumina fine particle may be, for example, as described above, equal to or smaller than 98 mass %, equal to or smaller than 93 mass %, or 80 mass %.

Also, the thermal insulator including silica fine particles and alumina fine particles has not only excellent heat resistance (a lower hot-wire shrinkage ratio) described above but also excellent strength. That is, for example, the thermal insulator may further have a compressive strength equal to or larger than 0.4 MPa. More specifically, for example, the thermal insulator may include silica fine particles equal to or larger than 15 mass % and alumina fine particles equal to or larger than 10 mass %, and may have a bulk density exceeding 300 kg/m$^3$ and equal to or smaller than 500 kg/m$^3$ and a compressive strength equal to or larger than 0.4 MPa.

Furthermore, for example, the thermal insulator may include silica fine particles equal to or larger than 5 mass % and alumina fine particles equal to or larger than 10 mass %, and may have a bulk density exceeding 400 kg/m$^3$ and equal to or smaller than 500 kg/m$^3$ and a compressive strength equal to or larger than 0.4 MPa. In this case, the compressive strength may be equal to or larger than 0.5 MPa, and also may be equal to or larger than 0.6 MPa.

Still further, since the thermal insulator achieves a sufficient strength without increasing its density as in the conventional technology, the thermal insulator effectively avoids a decrease in heat insulating performance due to solid heat transfer and, as a result, has excellent heat insulating performance.

That is, for example, the thermal insulator may be a thermal insulator having a heat conductivity at 600° C. being equal to or smaller than 0.08 W/(m·K). Furthermore, for example, the heat conductivity of the thermal insulator at 600° C. may be preferably equal to or smaller than 0.05 W/(m·K) and more preferably equal to or smaller than 0.04 W/(m·K).

Also, for example, the thermal insulator may be a thermal insulator having a heat conductivity at 800° C. being equal to or smaller than 0.09 W/(m·K). Furthermore, for example, the heat conductivity of the thermal insulator at 800° C. may be preferably equal to or smaller than 0.06 W/(m·K) and more preferably equal to or smaller than 0.05 W/(m·K).

Still further, for example, the thermal insulator may be a thermal insulator having a heat conductivity at 1000° C. being equal to or smaller than 0.10 W/(m·K). Furthermore, for example, the heat conductivity of the thermal insulator at 800° C. may be preferably equal to or smaller than 0.09 W/(m·K)

The thermal insulator may have a lower limit value of the heat conductivity at 600° C., 800° C., or 1000° C., which is not particularly limited and is 0.02 W/(m·K), for example. That is, for example, the thermal insulator may be a thermal insulator having a heat conductivity at 600° C. equal to or larger than 0.02 W/(m·K) and equal to or smaller than 0.08 W/(m·K). Also, for example, the thermal insulator may be a thermal insulator having a heat conductivity at 800° C. equal to or larger than 0.02 W/(m·K) and equal to or smaller than 0.09 W/(m·K). Furthermore, for example, the thermal insulator may be a thermal insulator having a heat conductivity at 1000° C. equal to or larger than 0.02 W/(m·K) and equal to or smaller than 0.10 W/(m·K).

Note that the thermal insulator has a structure in which the primary particles of the metal oxide fine particles with an average particle diameter equal to or smaller than 50 nm are associated by an intermolecular force to form secondary particles and these secondary particles are scattered in the reinforcing fiber.

And, as described above, with the use of the metal oxide fine particles, the thermal insulator has the pore structure in which the pores smaller than an average free path of air molecules (with a diameter one the order of nanometer) are formed inside the thermal insulator. As a result, the thermal insulator achieves excellent heat insulation performance in a wide temperature range from low to high temperatures.

As such, the thermal insulator has both excellent heat insulation and high strength. Therefore, for example, the thermal insulator is preferably used as a thermal insulator for a general industrial furnace required for processing or a thermal insulator for a reformer of a fuel cell.

Next, specific examples according to the present embodiment will be described.

Example 1

[Manufacture of Thermal Insulator]

A dry pressed compact including an anhydrous silica fine particles (hydrophilic fumed silica fine particles) with an average particle diameter of primary particles of approximately 13 nm and an E glass fiber with an average fiber diameter of 11 μm and an average fiber length of 6 mm and not including a binder was fabricated.

That is, a raw material of thermal insulator including 95 mass % of the silica fine particles and 5 mass % of the E glass fiber was put into a mixing device and was subjected to dry mixing. Then, from the obtained dry mixture powder, a plate-shaped dry pressed compact with 150 mm×100 mm in dimensions×25 mm in thickness was fabricated by dry press forming.

Specifically, a forming mold equipped with a predetermined deaeration mechanism was first filled with an appropriate amount of the dry mixture powder. Then, dry press forming was performed so as to obtain a desired bulk density. That is, in dry press forming, a press pressure was adjusted so that the dry pressed compact has a bulk density of 250 kg/m$^3$. After forming, the dry pressed compact was quickly taken out from the forming mold.

Next, the dry pressed compact was put into a commercially-available autoclave. Then, heating of the autoclave was started, and its temperature was increased for two hours from a room temperature to 170° C. Furthermore, the dry pressed compact was held in the autoclave under a pressurized vapor saturated atmosphere at a temperature of 170° C. for a predetermined time (0.5 hour, one hour, two hours, three hours, six hours, or nine hours), thereby curing the dry pressed compact. Then, the cured dry pressed compact was taken out from the autoclave, and was dried at 105° C.

Thus, a thermal insulator including 95 mass % of the silica fine particles and 5 mass % of the E glass fiber and being cured under the pressurized vapor saturated atmosphere at a temperature of 170° C. was obtained. Also obtained similarly were a thermal insulator cured under conditions similar to those above except that the dry pressed compact was held at 160° C. for two hours and a thermal insulator cured under conditions similar to those above except that the dry pressed compact was held at 180° C. for two hours.

Furthermore, also obtained as comparison targets were thermal insulators each cured by holding the dry pressed compact fabricated as described above at a temperature of 80° C. and a relative humidity of 90% RH without pressurization for a predetermined time (three hours, six hours, twelve hours, twenty-four hours, forty-eight hours, 100 hours, 250 hours, or 400 hours).

[Evaluation of Compressive Strength]

The compressive strength of each thermal insulator was measured by using a universal testing machine (TENSIRON RCT-1150A, Orientec Co., Ltd.). That is, from the thermal insulator, a test piece with 30 mm×15 mm in dimensions×25 mm in thickness was cut out. Next, a load was applied in a perpendicular direction with respect to a press surface (30 mm×15 mm) of the test piece (that is, to a surface (15 mm×25 mm) perpendicular to the press surface of the test piece).

Then, a value obtained by dividing a load when the test piece was broken (a maximum load) (N) by an area (m$^2$) of the surface to which the load was applied (the surface perpendicular to the press surface) was evaluated as a compressive strength (MPa). Also similarly, the compressive strength of the dry pressed compact at the time of reaching 170° C. after the start of heating the dry pressed compact before curing in the autoclave was evaluated.

Figures 4, 5, 6A:
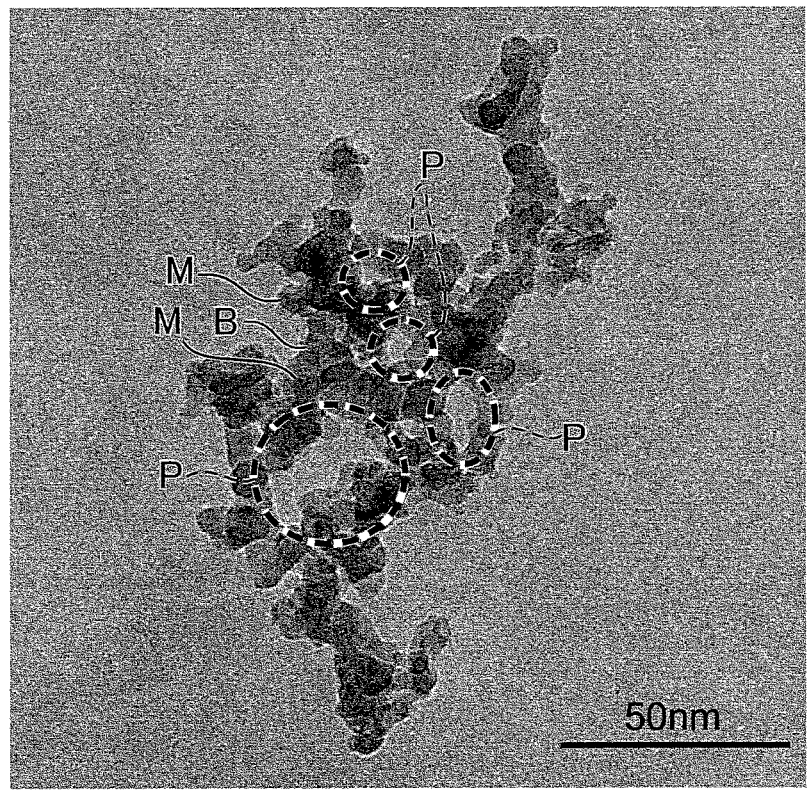
FIG. 4 is a diagram for describing an example of results of evaluating compressive strength of the thermal insulator with varied curing conditions in an example according to an embodiment of the present invention.
FIG. 5 is a diagram for describing an example of results of evaluating compressive strength of the thermal insulator with varied curing conditions in a comparative example according to an embodiment of the present invention.
FIG. 6A is a diagram for describing a transmission electron microscope photograph of the thermal insulator obtained in an example according to an embodiment of the present invention.

FIG. 4 and FIG. 5 depict curing conditions (curing temperature (° C.) and curing time (hr)) of each thermal insulator obtained by high-humidity curing using the autoclave ("A/C curing") and high-humidity curing at 80° C. ("vapor curing") and compressive strengths (a maximum value, a minimum value, and an arithmetic average value of the compressive strength of eight test pieces cut out from the respective thermal insulators) in correspondence with each other.

As depicted in FIG. 4 and FIG. 5, compressive strengths of the dry pressed compact before curing had an average value of 0.21 MPa. By contrast, as depicted in FIG. 4, the compressive strength of the thermal insulator was significantly increased by A/C curing.

That is, by A/C curing for an extremely short time, the average value of the compressive strengths was increased to 0.8 MPa or larger and, in particular, when the curing time exceeds 0.5 hour and was smaller than six hours, the compressive strength was increased to 1.0 MPa or larger. On the other hand, as depicted in FIG. 5, while the compressive strength of the thermal insulator was increased also by vapor curing, this curing was not so effective as A/C curing.

As such, a significant increase in compressive strength of the thermal insulator with its bulk density being kept was able to be extremely efficiently achieved by A/C curing. Note that, although the results are not shown, the compressive strength of the thermal insulator was similarly increased also by A/C curing at a temperature of 120° C. or 200° C.

Example 2

[Manufacture of Thermal Insulator]

A dry pressed compact including an anhydrous silica fine particles (hydrophilic fumed silica fine particles) with an average particle diameter of primary particles of approximately 13 nm, an E glass fiber with an average fiber diameter of 11 μm and an average fiber length of 6 mm, and a radiating and scattering material made of silicon carbide (SiC) with an average particle diameter of 1.8 μm and not including a binder was fabricated.

That is, a raw material of thermal insulator including 75 mass % of the silica fine particles, 5 mass % of the E glass fiber, and 20 mass % of the radiating and scattering material was used to fabricate a plate-shaped dry pressed compact in a manner similar to that of Example 1 described above.

Then, in a manner similar to that of Example 1 described above, the dry pressed compact was held in an autoclave under a pressurized vapor saturated atmosphere at a temperature of 170° C. for a predetermined time (two hours, four hours, eight hours, or sixteen hours), thereby a thermal insulator subjected to A/C curing was manufactured.

[Evaluation of Heat Conductivity]

Heat conductivity at 600° C. of each thermal insulator was measured by a cyclic heat method. That is, a temperature wave was propagated through a test piece of a predetermined size cut out from each thermal insulator and a thermal diffusion ratio was measured from its propagation time. Then, a heat conductivity was calculated from the thermal diffusion ratio and a specific heat and density separately measured. Note that a wave of temperature with a temperature amplitude of approximately 4° C. and a cycle of approximately one hour was used as a temperature wave. Also, time required for the temperature wave to pass through two points in the test piece was taken as a propagation time. Note that a heat conductivity of the dry pressed compact was similarly measured. As a result, the thermal insulators and the dry pressed compact at 600° C. each had a heat conductivity of 0.03 to 0.05 W/(m·K), and therefore had excellent heat insulation.

[Observation by Transmission Electron Microscope]

Figure 6B:
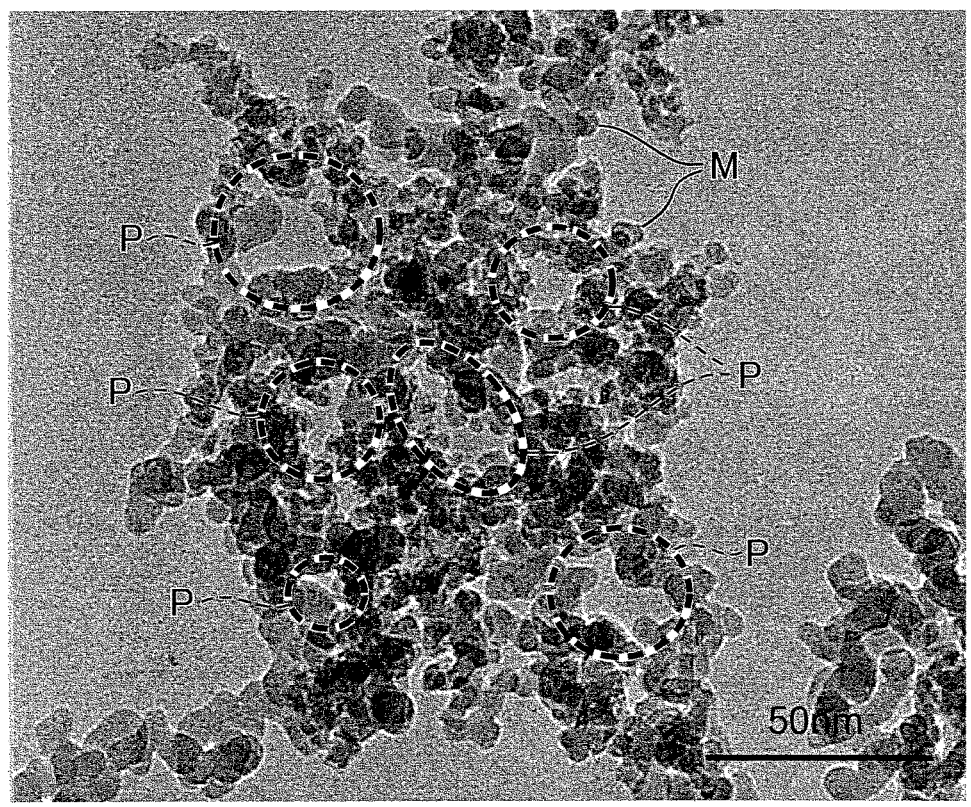
FIG. 6B is a diagram for describing a transmission electron microscope photograph of a dry pressed compact obtained in an example according to an embodiment of the present invention.

The thermal insulator obtained by A/C curing at 170° C. for four hours and the dry pressed compact before curing were observed with a transmission electron microscope (TEM). FIG. 6A and FIG. 6B depict a TEM photograph of the thermal insulator and a TEM photograph of the dry pressed compact, respectively.

First, as depicted in FIG. 6B, the dry pressed compact before curing had a pore structure formed of primary particles (silica fine particles) M agglomerated by dry press forming. This pore structure had fine pores P made of the primary particles M (in FIG. 6B, the pore diameter is equal to or smaller than 50 nm).

By contrast, as depicted in FIG. 6A, the thermal insulator subjected to A/C curing had a pore structure formed of primary particles (silica fine particles) M coupled by the bridge structure B. This pore structure also had fine pores P made of the primary particles M (in FIG. 6A, the hole diameter is equal to or smaller than 50 nm).

Therefore, as a reason for improving the strength of the thermal insulator by A/C curing, generation of the bridge structure B not observed before curing was thought to be involved. Furthermore, the pore structure was maintained even after generation of the bridge structure B, which supported that the thermal insulator after A/C curing had excellent heat insulation as described above.

[Evaluation of Dust Emission Properties]

Dust emission properties of the thermal insulator obtained by A/C curing at 170° C. for four hours and the dry pressed compact before curing were evaluated. That is, an adhesive tape (596-921 manufactured by ASKUL Corporation) having an area of 1260 mm$^2$ was adhered to a front surface of a test piece cut out from each thermal insulator and the dry pressed compact. Next, the adhesive tape was peeled off, and the weight of dust attached to the adhesive tape was measured with an electronic balance.

As a result, the amount of dust collected from the dry pressed compact was approximately $6.0\times10^{-5}$ (g/cm$^3$), while the amount of dust collected from the thermal insulator was approximately $2.0\times10^{-5}$ (g/cm$^3$).

That is, dust emission properties of the thermal insulator subjected to A/C curing was significantly reduced compared with the dry thermal insulator before curing. The reason for the reduction in dust emission properties by A/C curing was thought to be such that the silica fine particles as primary fine particles are coupled together by the bridge structure.

Example 3

[Manufacture of Thermal insulator]

By adjusting a press pressure at the time of dry press forming, dry pressure-formed compacts and thermal insulators with various bulk densities (220 to 280 kg/m$^3$) were manufactured. First, as Comparative Example I, in a manner similar to that of Example 1 described above, a dry pressed compact including silica fine particles and an E glass fiber was manufactured. Next, as in a manner similar to that of Example 1, a thermal insulator was manufactured as Example I by performing A/C curing on the dry pressed compact according to Comparative Example I by holding the dry pressed compact under a pressurized vapor saturated atmosphere at a temperature of 170° C. for four hours.

Also, in a manner similar to that of Example 1 described above except that an S2 glass fiber (an average fiber diameter of 10 μm and an average fiber length of 6 mm) was used in place of the E glass fiber, a dry pressed compact including silica fine particles and the S2 glass fiber was manufactured as Comparative Example II. Furthermore, in a manner similar to that of Example 1 described above, a thermal insulator was manufactured as Example II by performing A/C curing on the dry pressed compact according to Comparative Example II by holding the dry pressed compact under a pressurized vapor saturated atmosphere at a temperature of 170° C. for four hours.

[Evaluation of Compressive Strength]

Compressive strengths of thus obtained thermal insulators of two types (Example I and Example II) and dry pressure-formed bodies of two types (Comparative Example I and Comparative Example II) were measured, in a manner similar to that of Example 1 described above.

Figure 7:
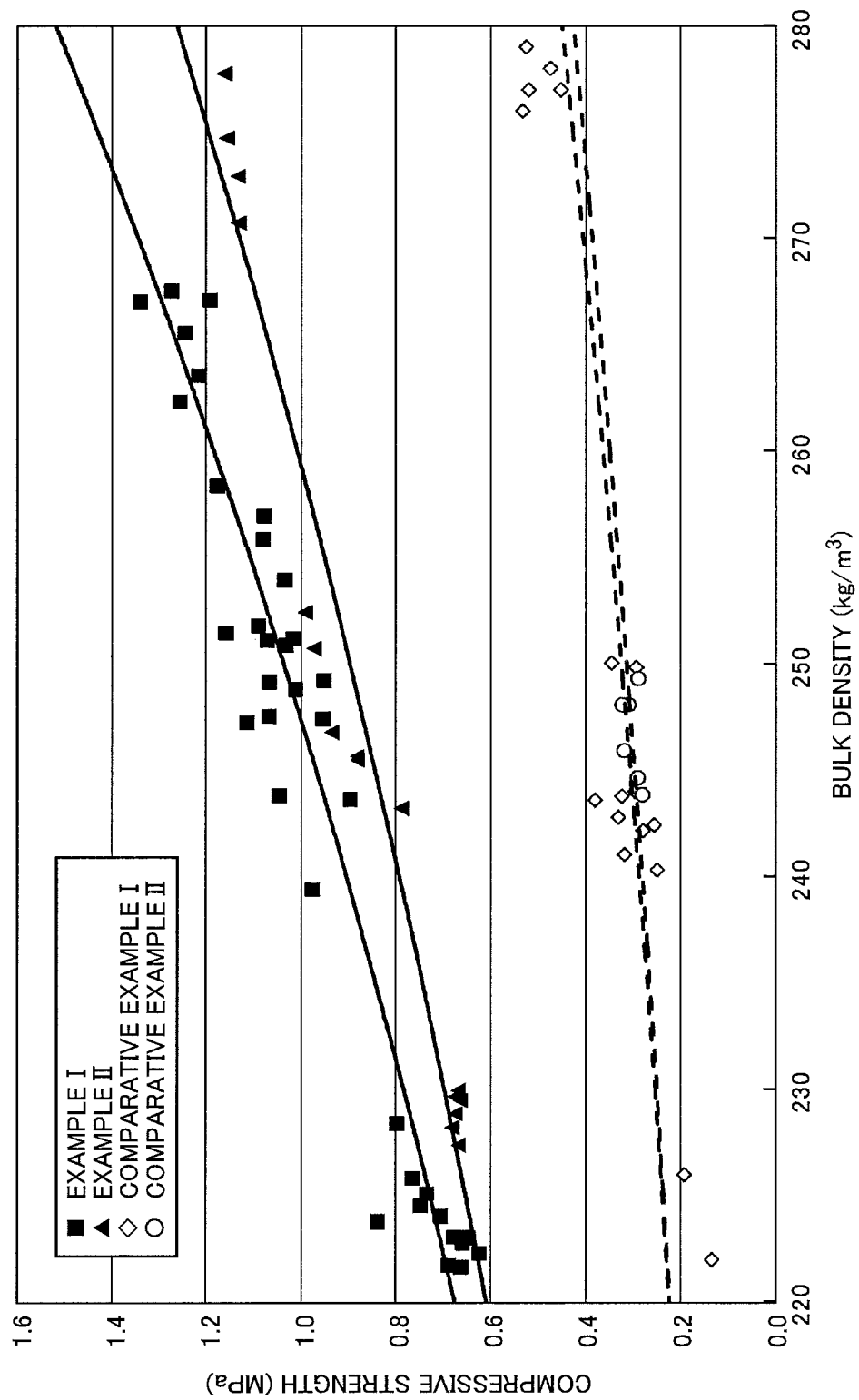
FIG. 7 is a diagram for describing an example of results of evaluating correlations between bulk density and compressive strength of the thermal insulator in examples according to an embodiment of the present invention.

FIG. 7 depicts results obtained by measuring compressive strengths. The horizontal axis and the vertical axis of FIG. 7 represent bulk density (kg/m$^3$) and compressed density (MPa), respectively, of the thermal insulators and the dry pressure-formed bodies. In FIG. 7, black square marks and a solid line on an upper side represent the results of the thermal insulator according to Example I, black triangular marks and a solid line on a lower side represent the results of the thermal insulator according to Example II, white diamond marks and a broken line on an upper side represent the results of the dry pressed compact according to Comparative Example I, and white circular marks and a broken line on a lower side represent the results of the dry pressed compact according to Comparative Example II.

As depicted in FIG. 7, the compressive strength of the dry pressed compact not subjected to A/C curing was extremely low, 0.2 MPa or smaller when the bulk density was 220 to 230 kg/m$^3$ and no more than approximately 0.5 MPa even when the bulk density was increased to approximately 280 kg/m$^3$.

By contrast, the compressive strength of the dry pressed compact subjected to A/C curing was equal to or larger than 0.6 MPa when the bulk density was equal to or larger than 220 kg/m$^3$ and equal to or smaller than 250 kg/m$^3$ and, furthermore, was equal to or larger than 0.8 MPa (0.8 to 1.4 MPa) when the bulk density exceeded 250 kg/m$^3$ and equal to or smaller than 280 kg/m$^3$.

As such, when the bulk density was on the same order, the compressive strength of the dry pressed compact obtained by A/C curing was significantly high compared with the dry pressed compact. That is, it has been confirmed that the strength of the thermal insulator is effectively improved by A/C curing without unnecessarily increasing its bulk density (without decreasing heat insulation by increasing solid heat transfer).

Example 4

[Manufacture of Thermal Insulator]

First, a dry pressed compact including silica fine particles, an S2 glass fiber (magnesia silicate glass fiber), and silicon carbide and not including a binder was fabricated as Comparative Example III. That is, in a manner similar to that of Example 1 described above, a dry pressed compact was fabricated by using a raw material of thermal insulator including 75 mass % of the silica fine particles, 5 mass % S2 of the glass fiber, and 20 mass % of the silicon carbide.

Next, in a manner similar to that of Example 1 described above, a thermal insulator was manufactured as Example III by performing A/C curing on the dry pressed compact according to Comparative Example III by holding the dry pressed compact under a pressurized vapor saturated atmosphere at a temperature of 170° C. for four hours.

[Evaluation of Characteristics After Water Immersion]

From each of the dry pressed compact according to Comparative Example III and the thermal insulator according to Example III, a plate-shaped test piece 150 mm in length×100 mm in width, and 25 mm in thickness was fabricated, and the whole test piece was immersed in water for one hour. Then, the test piece was taken out from water, and was dried by a drier at 105° C. for twenty-four hours.

The dimensions (length, width, and thickness) of the test pieces after drying were measured as dimensions after water immersion. Note that the test piece was shrunk due to water immersion and drying and its dimensions were reduced.

Then, a ratio of a difference between the dimensions of the test piece before water immersion and the dimensions after water immersion with respect to the dimensions before water immersion was evaluated as a shrinkage ratio (%). Also, the compressive strength of the test piece after water immersion was evaluated in a manner similar to that of Example 1 described above.

Figure 8:
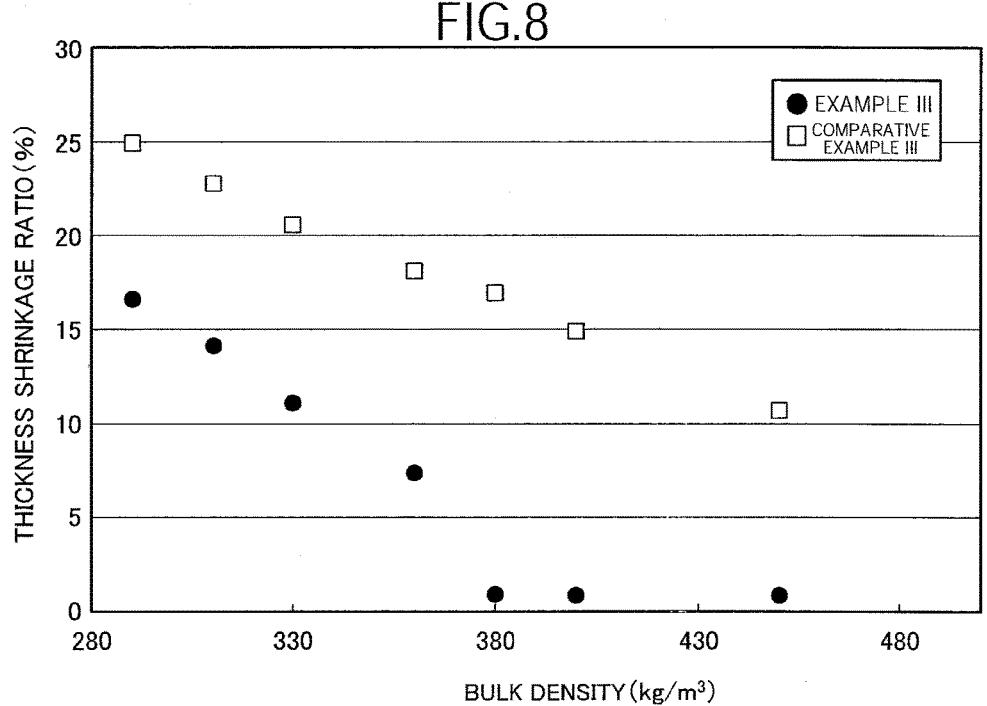
FIG. 8 is a diagram for describing an example of results of evaluating thickness shrinkage ratios of the thermal insulator after water immersion in an example according to an embodiment of the present invention.
Figure 9:
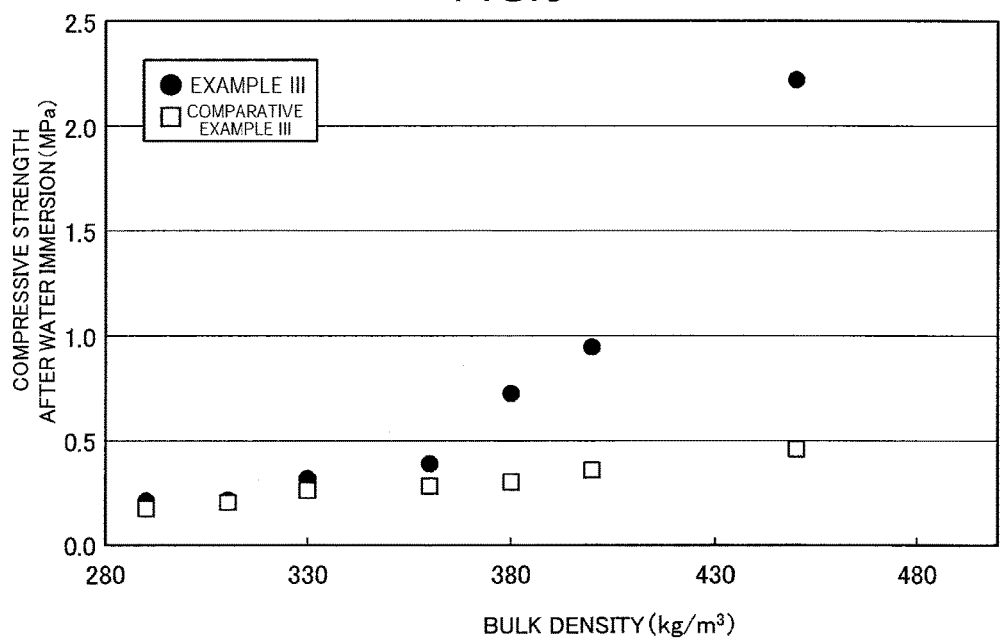
FIG. 9 is a diagram for describing an example of results of evaluating compressive strengths of the thermal insulator after water immersion in the example according to the embodiment of the present invention.

FIG. 8 depicts the results of evaluating thickness shrinkage ratios. The horizontal axis of FIG. 8 represents bulk density (kg/m$^3$), and the vertical axis represents a thickness shrinkage ratio (%). FIG. 9 depicts the results of measuring compressive strengths after water immersion. The horizontal axis of FIG. 9 represents bulk density (kg/m$^3$), and the vertical axis represents compressive strength (MPa) after water immersion. In FIG. 8 and FIG. 9, black circular marks represent the results of the thermal insulator according to Example III, and white square marks represent the results of the dry pressed compact according to Comparative Example III.

As depicted in FIG. 8, the thickness shrinkage ratio of the thermal insulator according to Example III cured at the time of manufacture was significantly lowered compared with that of the dry pressed compact according to Comparative Example III not subjected to curing. In particular, the thickness of the thermal insulator with a bulk density at least equal to or larger than 380 kg/m$^3$ was not substantially shrunk. Note that the length and width shrinkage ratios of the thermal insulator according to Example III and the dry pressed compact according to Comparative Example III also exhibited similar tendencies.

Also, as depicted in FIG. 9, the compressive strength of the thermal insulator according to Example III after water immersion was kept high compared with that of the dry pressed compact according to Comparative Example III after water immersion. In particular, the thermal insulator with a bulk density at least equal to or larger than 380 kg/m$^3$ exhibited a significantly high compressive strength compared with the dry pressed compact.

As such, it has been confirmed that in the thermal insulator cured at the time of manufacture, a reduction (shrinkage) in dimension and a decrease in compression strength (degradation in strength) are effectively suppressed even if water temporarily penetrates through the thermal insulator.

Example 5

Various thermal insulators of eleven types as depicted in FIG. 10 were prepared, and their characteristics were evaluated. FIG. 10 shows contents (mass %) of the metal oxide fine particles, the reinforcing fiber, and radiating and scattering material included in each thermal insulator, compressive strength at normal (MPa), compressive strength (MPa) after water immersion measured in a manner similar to that of Example 4 described above, hot-wire shrinkage ratio (%) at 1000° C., hot-wire shrinkage ratio (%) at 1150° C., and heat conductivity (W/(m·K)) at 600° C., 800° C. and 1000° C.

Note that numerical values described in "the metal oxide particles (mass %)" column each represent a ratio (%) of each of the content of silica fine particles and the content of alumina fine particles with respect to the total amount of the metal oxide fine particles used. Also, "#250", "#350", and "#450" in FIG. 10 represent bulk densities of "250 kg/m$^3$", "350 kg/m$^3$", and "450 kg/m$^3$", respectively. Furthermore, a characteristic with "−" in FIG. 10 indicates that no evaluation was made.

[Manufacture of Thermal Insulator]

A thermal insulator including only silica fine particles as metal oxide fine particles was manufactured as Example IV. Specifically, in a manner similar to that of Example 1 described above, a plate-shaped dry pressed compact including 75 mass % of the silica fine particles, 5 mass % of the S2 glass fiber, and 20 mass % of the silicon carbide and not including a binder was first fabricated. Next, in a manner similar to that of Example 1 described above, a thermal insulator according to Example IV was manufactured by performing A/C curing on the dry pressed compact by holding the dry pressed compact under a pressurized vapor saturated atmosphere at a temperature of 170° C. for four hours.

Also, thermal insulators including silica fine particles and alumina fine particles as metal oxide fine particles were manufactured as Examples V to XI. Specifically, in a manner similar to that of Example 1 described above, plate-shaped dry pressure-formed bodies including 75 mass % of the silica fine particles and alumina fine particles in total, 5 mass % of the S2 glass fiber or alumina fiber, and 20 mass % of the silicon carbide or zirconium silicate and not including a binder were first fabricated. Next, in a manner similar to that of Example 1 described above, thermal insulators according to Examples V to XI were manufactured by performing A/C curing on the dry pressure-formed bodies by holding the dry pressure-formed bodies under a pressurized vapor saturated atmosphere at a temperature of 170° C. for four hours.

Note that anhydrous alumina fine particles with an average particle diameter of a primary particle of approximately 13 nm (hydrophilic fumed alumina fine particles) were used as alumina fine particles. An alumina fiber (72% Al$_2$O$_3$ and 28% SiO$_2$) with an average fiber diameter of 7 μm and an average fiber length of 6 mm was used as an alumina fiber. Zirconium silicate (ZrSiO$_4$) with an average particle diameter of 1.0 μm was used as zirconium silicate.

Furthermore, thermal insulators including only alumina fine particles as metal oxide fine particles were prepared as Comparative Examples IV to VI. That is, as Comparative Example IV, a thermal insulator was manufactured in a manner similar to that of Example IV described above except that alumina fine particles were used in place of silica fine particles.

As Comparative Example V, a commercially-available plate-shaped dry pressed compact including 60 mass % of the alumina fine particles, 5 mass % of the alumina fiber, and 35 mass % of the zirconium silicate was prepared.

Still further, in a manner similar to that of Example 1 described above, a thermal insulator according to Comparative Example VI was manufactured by performing A/C curing on the dry pressed compact according to Comparative Example V by holding the dry pressed compact under a pressurized vapor saturated atmosphere at a temperature of 170° C. for four hours.

[Evaluation of Compressive Strength]

A compressive strength of each prepared thermal insulator was evaluated as a normal compressive strength, in a manner similar to that of Example 1 described above. Also, a compressive strength after water immersion was evaluated in a manner similar to that of Example 4 described above.

As depicted in FIG. 10, any of the thermal insulators according to Examples IV to XI exhibited excellent strength. That is, for example, when the bulk density was 450 kg/m$^3$ (#450), the compressive strength (normal) of the thermal insulators according to Comparative Examples IV to VI was equal to or smaller than 0.34 MPa, and that the thermal insulators according to Examples IV to XI was equal to or larger than 0.6 MPa.

Also, the thermal insulators according to Comparative Examples V and VI decayed by water immersion, and a compressive strength after water immersion was not able to be measured. By contrast, the thermal insulators according to Examples IV, VIII, X, and XI had the compressive strength after water immersion decreased compared with those before water immersion (normal), but did not decay even after water immersion and kept a predetermined compressive strength.

Note that the compressive strength of the thermal insulator tended to increase as the content of silica fine particles increased.

[Evaluation of Hot-Wire Shrinkage Ratio]

From each thermal insulator, a plate-shaped test piece with a length of 150 mm, a width of 30 mm, and a thickness of 15 mm was fabricated. This test piece was heated at 1000° C. or 1150° C. for twenty-four hours, and the length of the test piece after heating was measured. Then, a hot-wire shrinkage ratio was calculated from the following equation: Hot-wire shrinkage ratio (%)={(X−Y)/X}×100. Note that X is a length (mm) before heating and Y is a length (mm) after heating in this equation.

As depicted in FIG. 10, any thermal insulator had a hot-wire shrinkage ratio at 1000° C. equal to or smaller than 5%, exhibiting excellent heat resistance. In particular, the thermal insulators according to Examples V to XI had a hot-wire shrinkage ratio at 1000° C. equal to or smaller than 1.5%.

Note that the hot-wire shrinkage ratio tended to decrease as the content of alumina fine particles increased. Also, the thermal insulator not including alumina fine particles according to Example IV also had a hot-wire shrinkage ratio at 1000° C. equal to or smaller than 3% when the bulk density was 450 kg/m$^3$.

Any of the thermal insulators according to Examples V to XI had a hot-wire shrinkage ratio at 1150° C. equal to or smaller than 25% and, in particular, equal to or smaller than 15% when the bulk density was 450 kg/m$^3$. Also, when the content of silica fine particles exceeded 37.5 mass %, the hot-wire shrinkage ratio at 1150° C. was equal to or smaller than 10%. Furthermore, when the bulk density was 350 kg/m$^3$ or 450 kg/m$^3$, if the content of alumina fine particles exceeded 56 mass %, the hot-wire shrinkage ratio at 1150° C. was equal to or smaller than 3%.

[Evaluation of Heat Conductivity]

Heat conductivity (W/(m·K)) at 600° C., 800° C., or 1000° C. of each thermal insulator was measured by a cyclic heat method. That is, a temperature wave was propagated through a test piece of a predetermined size cut out from each thermal insulator and a thermal diffusion ratio was measured from its propagation time. Then, a heat conductivity was calculated from the thermal diffusion ratio and a specific heat and density separately measured. Note that a wave of temperature with a temperature amplitude of approximately 4° C. and a cycle of approximately one hour was used as a temperature wave. Also, time required for the temperature wave to pass through two points in the test piece was taken as a propagation time.

As depicted in FIG. 10, any thermal insulator exhibited excellent heat insulation (a low heat conductivity). That is, any thermal insulator has a heat conductivity at 600° C. equal or smaller than 0.045 (W/(m·K)). Also, any thermal insulator has a heat conductivity at 800° C. equal or smaller than 0.050 (W/(m·K)). Furthermore, any thermal insulator has a heat conductivity at 1000° C. equal or smaller than 0.085 (W/(m·)).

As such, it has been confirmed that the thermal insulator including silica fine particles has both excellent heat insulation and excellent strength. It has also been confirmed that the thermal insulator including not only silica fine particles but also alumina fine particles has not only excellent heat insulation and excellent strength but also further excellent heat resistance.

REFERENCE SIGNS LIST

B . . . bridge structure, L . . . liquid bridge structure, M, M1, M2 . . . primary particle, P . . . pore, Sa secondary particle, Sb . . . pore structure, S1 . . . curing step, S2 . . . drying step.

The invention claimed is:

1. A method of manufacturing a thermal insulator, comprising:
   a curing step of curing a dry pressed compact including metal oxide fine particles with an average particle diameter equal to or smaller than 50 nm and a reinforcing fiber under a pressurized vapor saturated atmosphere at a temperature equal to or higher than 100° C.,
   wherein the metal oxide fine particles include alumina fine particles.

2. The method of manufacturing a thermal insulator according to claim 1, wherein
   in the curing step, part of the metal oxide fine particles is eluted between the metal oxide fine particles to form a liquid bridge structure, and
   in a drying step, the bridge structure is solidified.

3. The method of manufacturing a thermal insulator according to claim 1, wherein the metal oxide fine particles include silica fine particles.

4. The method of manufacturing a thermal insulator according to claim 1, wherein the dry pressed compact includes 50 to 98 mass % of the metal oxide fine particles and 2 to 20 mass % of the reinforcing fiber.

5. The method of manufacturing a thermal insulator according to claim 1, wherein
   the dry pressed compact does not comprise a binder.

6. The method of manufacturing a thermal insulator according to claim 1, further comprising:
   a step of mixing the metal oxide fine particles and the reinforcing fiber by a dry method to fabricate a dry mixture; and
   a step of pressure-forming the dry mixture by a dry method to fabricate the dry pressed compact.

7. The method of manufacturing a thermal insulator according to claim 1, wherein the content of the alumina fine particles is 20 mass % or more.

8. The method of manufacturing a thermal insulator according to claim 1, wherein the dry pressed compact further includes a radiating and scattering material.

9. The method of manufacturing a thermal insulator according to claim 8, wherein the dry pressed compact includes:
   50 to 98 mass % of the metal oxide fine particles;
   2 to 20 mass % of the reinforcing fiber; and
   5 to 40 mass % of the radiating and scattering material.

10. The method of manufacturing a thermal insulator according to claim 1, wherein the reinforcing fiber has an average fiber length of equal to or larger than 1 mm and equal to or smaller than 10 mm.

11. The method of manufacturing a thermal insulator according to claim 2, wherein
the bridge structure comprises a portion bridging an alumina fine particle and a silica fine particle; and
the thermal insulator comprises alumina fine particles equal to or larger than 10 mass % and silica fine particles equal to or larger than 5 mass % based on the mass of the thermal insulator.

\* \* \* \* \*